(12) United States Patent
Chih et al.

(10) Patent No.: US 7,484,269 B2
(45) Date of Patent: Feb. 3, 2009

(54) PORTABLE DEVICE CAPABLE OF STANDING AND HANGING BY HANDLE ASSEMBLY THEREOF

(75) Inventors: Ting-Hui Chih, Hualien (TW); Wen-Ching Hsieh, Taipei County (TW)

(73) Assignee: Qisda Corporation, Taoyuan County (TW)

( * ) Notice: Subject to any disclaimer, the term of this patent is extended or adjusted under 35 U.S.C. 154(b) by 323 days.

(21) Appl. No.: 11/269,763

(22) Filed: Nov. 9, 2005

(65) Prior Publication Data

US 2006/0144186 A1 Jul. 6, 2006

(30) Foreign Application Priority Data

Dec. 21, 2004 (TW) .............................. 93139824 A

(51) Int. Cl.
*E05C 17/64* (2006.01)
*A45C 13/22* (2006.01)
(52) U.S. Cl. .......................................... 16/340; 16/444
(58) Field of Classification Search ......... 361/680–687; 16/340, 365, 366, 337, 334, 389, 367, 444, 16/445, 438, 900, 110.1; 248/917–923, 284.1; 206/320, 305, 576, 45.23; 220/524, 327, 220/328, 338, 908, 909

See application file for complete search history.

(56) References Cited

U.S. PATENT DOCUMENTS

| | | | | |
|---|---|---|---|---|
| 4,951,241 A | * | 8/1990 | Hosoi et al. .................. | 361/680 |
| 5,205,645 A | * | 4/1993 | Lee ............................. | 362/431 |
| 5,642,258 A | * | 6/1997 | Barrus et al. ................. | 361/683 |
| D430,156 S | * | 8/2000 | Yamada ..................... | D14/328 |
| 6,253,419 B1 | * | 7/2001 | Lu ............................... | 16/340 |
| 6,499,187 B2 | * | 12/2002 | Hollingsworth ............ | 16/114.1 |
| 2003/0160138 A1 | * | 8/2003 | Rawlings et al. ......... | 248/176.3 |

FOREIGN PATENT DOCUMENTS

| | | | | |
|---|---|---|---|---|
| FR | 2224355 A | * | 12/1974 | |
| JP | 01152798 A | * | 6/1989 | |
| JP | 2003318555 A | * | 11/2003 | |

* cited by examiner

*Primary Examiner*—Chuck Y. Mah

(57) ABSTRACT

A portable device capable of standing and hanging by a handle assembly thereof. The portable device includes a main body and a handle assembly. The handle assembly is connected to the main body, allowing the main body to stand on a surface when the handle assembly is spread to a limit position.

6 Claims, 6 Drawing Sheets

PORTABLE DEVICE CAPABLE OF STANDING AND HANGING BY HANDLE ASSEMBLY THEREOF

BACKGROUND OF THE INVENTION

1. Field of the Invention

The invention relates to a device provided with a handle assembly which allows the device to be carried, hung on a wall or stand on a surface.

2. Brief Discussion of the Related Art

Many kinds of devices (e.g. liquid crystal devices) are provided with bases to stand on a surface (e.g. table surface). For transportation, the users generally hold the devices in their arms. Furthermore, some of the devices can be hung on walls by additional structures.

SUMMARY OF THE INVENTION

A portable device capable of standing and hanging by a handle assembly thereof is provided. An exemplary embodiment of a portable device includes a main body and a handle assembly. The handle assembly is connected to the main body, allowing the main body to stand on a surface when the handle assembly is spread to a limit position, and be carried or hung on a wall when collapsed.

Furthermore, the handle assembly comprises a support connected to the main body, an extending portion contacting the surface, and a shaft structure connecting the support and the extending portion so that the extending portion can be rotated around the support.

Furthermore, the shaft structure comprises a supporting stand fixed to the support, and a rotary shaft supported by the supporting stand and fixed to the extending portion, whereby the rotary shaft stops the handle assembly in the limit position by abutting the supporting stand.

Furthermore, the extending portion comprises a positioning protrusion abutting the support when the handle assembly is spread to the limit position.

Note that the portable device may be a liquid crystal display.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the subsequent detailed description and the accompanying drawings, which are given by way of illustration only, and thus are not limitative of the present invention, and wherein.

DETAILED DESCRIPTION OF THE PREFERRED EMBODIMENTS

Figure 1A:
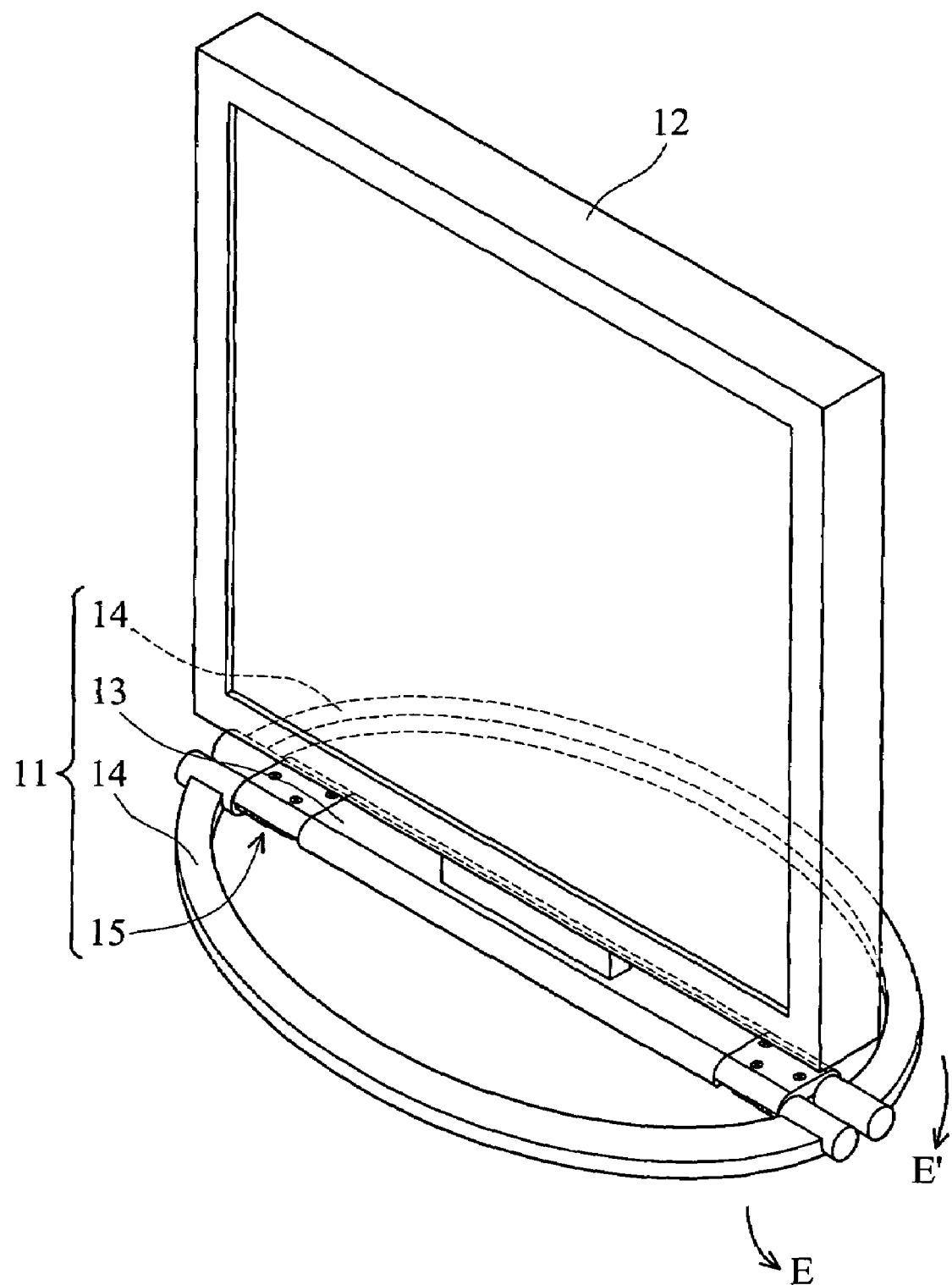
FIG. 1A depicts a device provided with a handle assembly in accordance with an embodiment of the invention, wherein the handle assembly is spread.
Figure 1B:
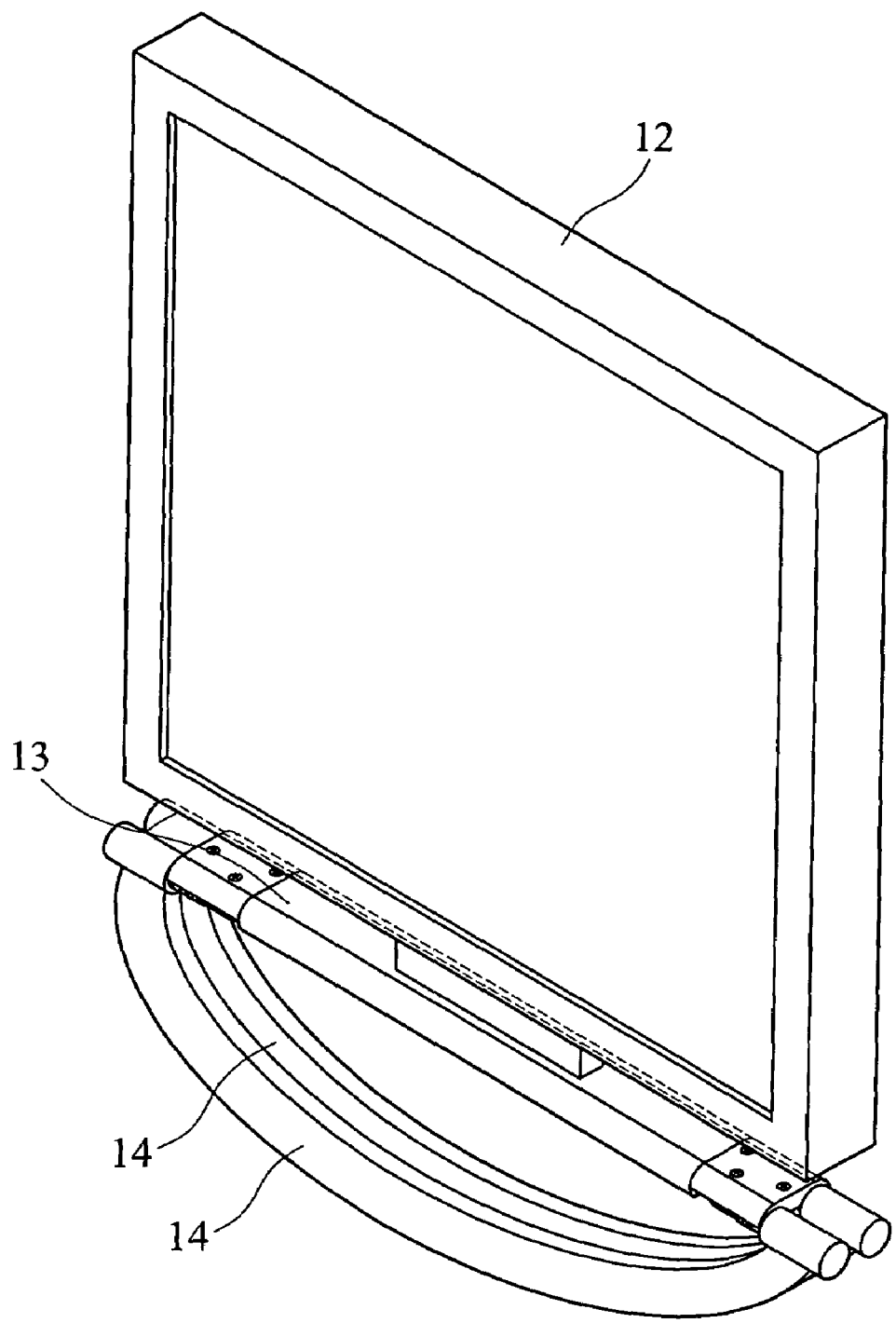
FIG. 1B depicts the device of FIG. 1A, wherein the handle assembly is collapsed.

Referring to FIGS. 1A and 1B, a device (e.g. liquid crystal device) 10 comprises a main body 12 and a handle assembly 11. The handle assembly 11 can be spread or collapsed by rotation in directions E, E'. As shown in FIG. 1A, the spread handle assembly 11 allows the main body 12 to stand on a surface (e.g. a table surface) for user's view or use. As shown in FIG. 1B, the collapsed handle assembly 11 allows the main body 12 to be carried or hung on a wall or an apparatus.

Figure 2:
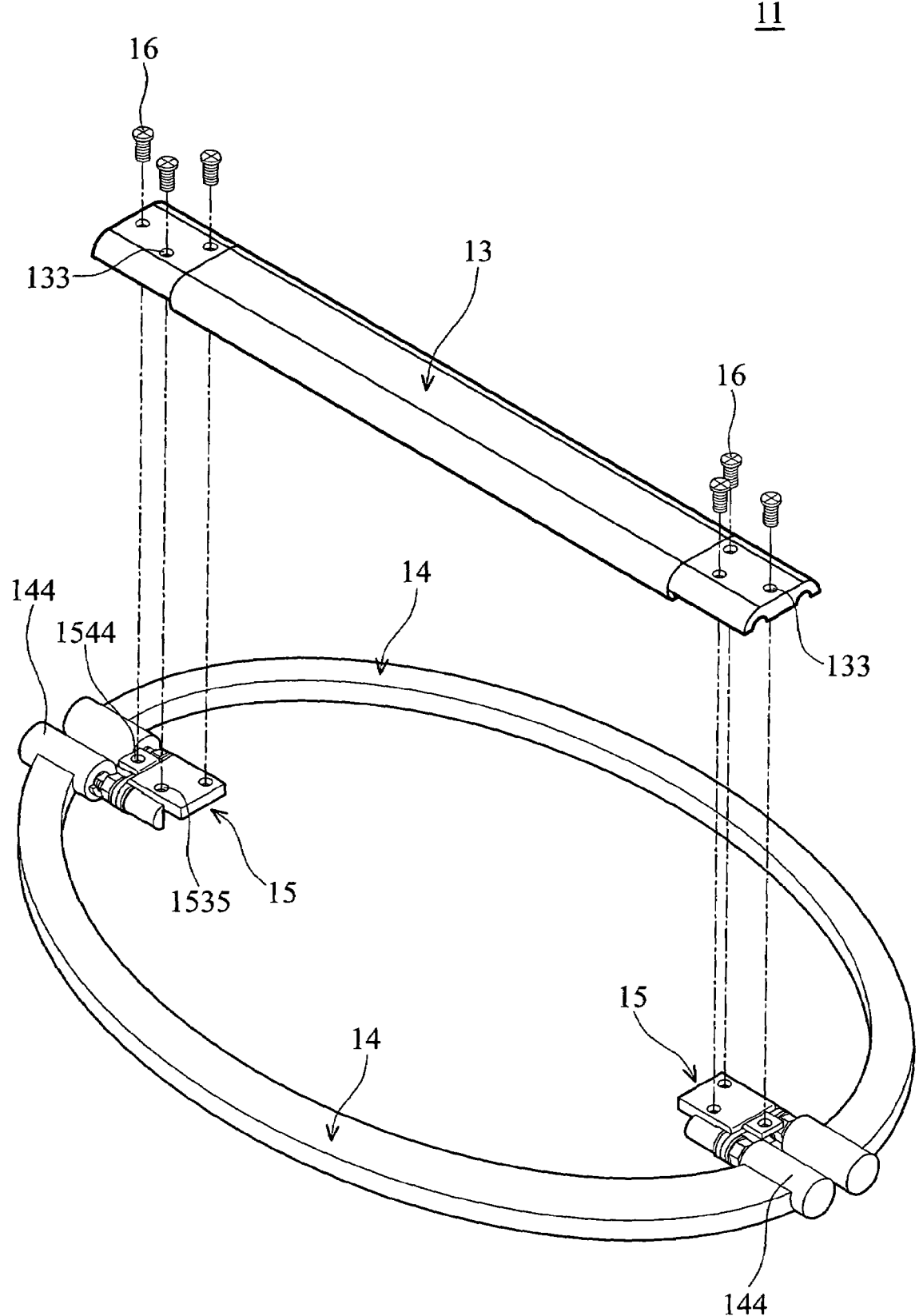
FIG. 2 is an exploded view of the handle assembly of FIG. 1A.
Figure 3:
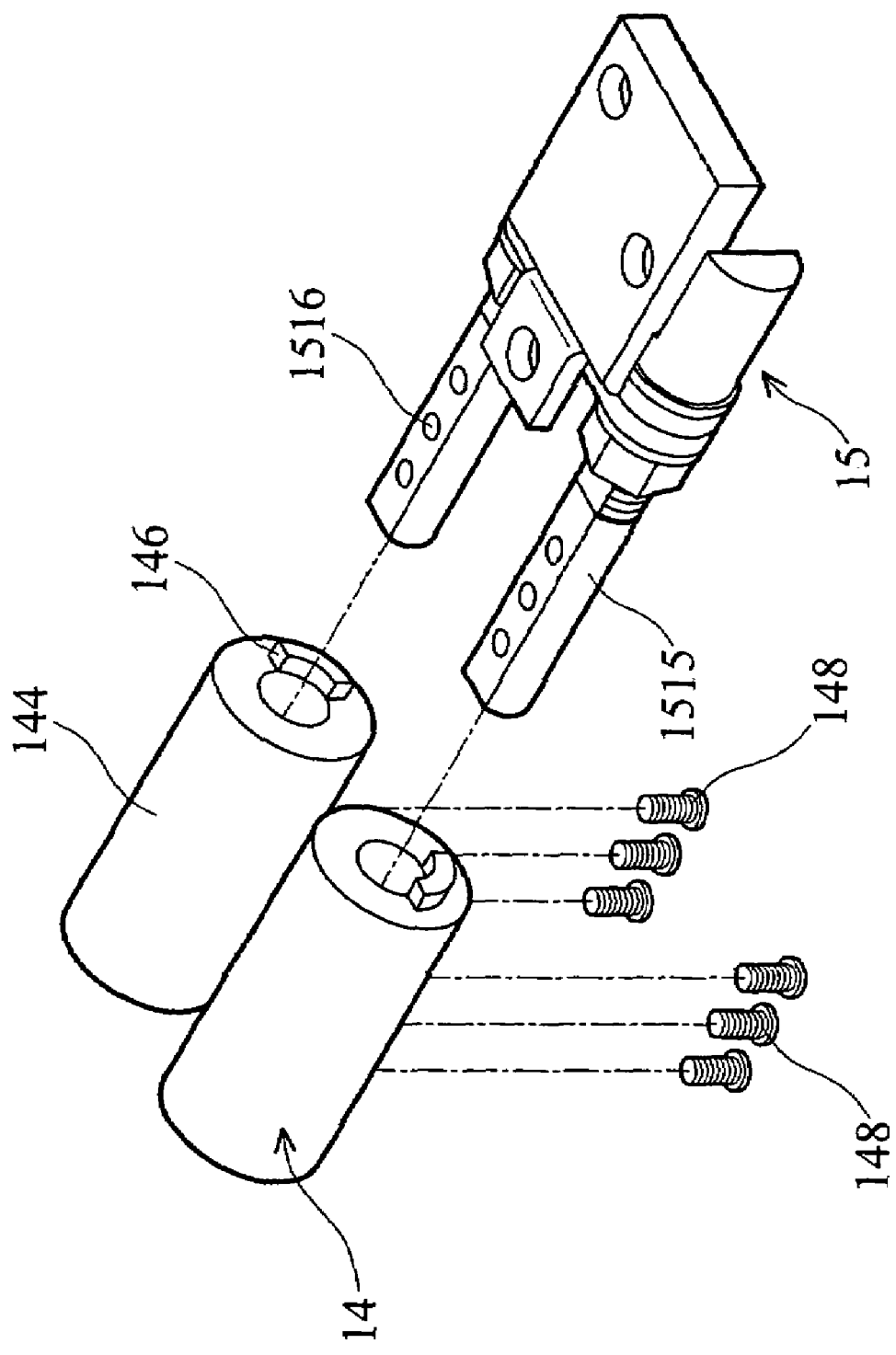
FIG. 3 is a local view of the handle assembly of FIG. 2, wherein the shaft structure is separated from the handle assembly.

Referring to FIGS. 2 and 3, the handle assembly 11 comprises a support 13, a pair of extending portions 14 and a pair of shaft structures 15, which are described in the following:

Each extending portion 14 extends away from one of the shaft structures 15, turns and then approaches the other, providing a large bottom area for stabilizing the main body 12 on the surface. In the embodiment, the pair of extending portions 14 curve and are symmetrical. Furthermore, each extending portion 14 has connecting sleeves 144 at both ends. Each connecting sleeve 144 has a closed end and an open end on which a positioning protrusion 146 is fixed.

The support 13 is connected to the main body 12 and oriented lengthwise with the shaft structures 15 disposed at both ends thereof. On the support 13 are provided a plurality of holes 133.

The shaft structures 15 allow the extending portions 14 to rotate around the support 13 whereby the handle assembly 11 is spread or collapsed. Structurally, an end of the shaft structure 15 is fixed to the support 13 via screws 16 (see FIG. 2) while the other end of the shaft structure 15 is fixed to the extending portions 14 via screws 148 (FIG. 3). Detailed descriptions of the connection therebetween will be given after the introduction of the shaft structure 15 beginning at the next paragraph.

Figure 4:
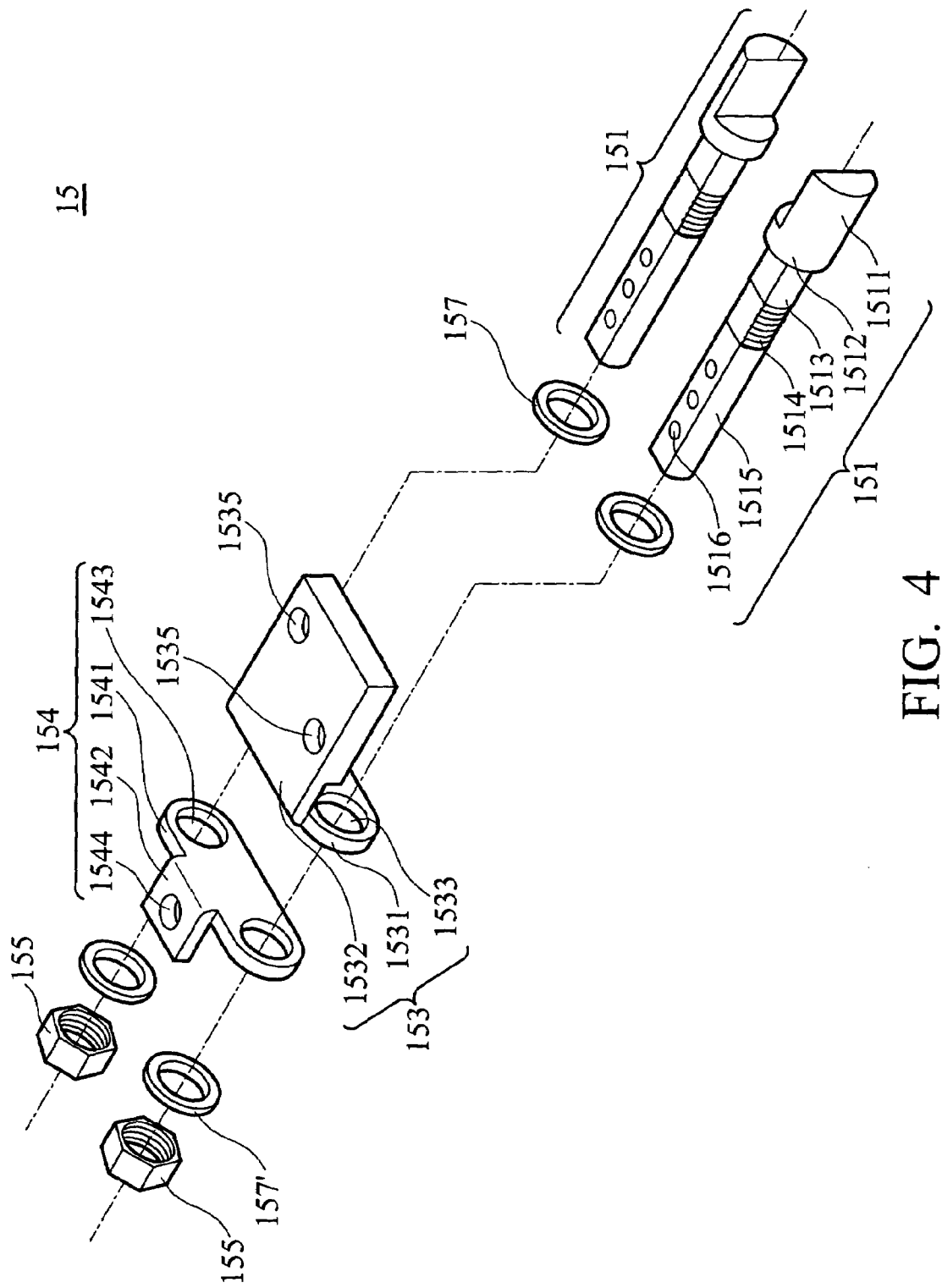
FIG. 4 is a perspective exploded view of the shaft structure of FIG. 3.

Referring to FIG. 4, the shaft structure 15 comprises a pair of parallel rotary shafts 151, a supporting stand 153, a connecting element 154, a pair of nuts 155 and a plurality of washers 157, 157', which are described in the following:

Each rotary shaft 151 comprises a positioning portion 1511, an expanding portion 1512, a supporting portion 1513, a threaded portion 1514 and a shank 1515 connected in sequence, wherein the positioning portion 1511 is substantially semi-cylindrical, and the shank 1515 has a plurality of holes 1516 therein.

The supporting stand 153 comprises a planar stand body 1531 and a platform 1532. Openings 1533 are provided on the stand body 1531. Holes 1535 are provided on the platform 1532.

The connecting element 154 comprises a planar element body 1541 substantially parallel to the stand body 1531, and a planar connecting portion 1542 substantially parallel to the platform 1532. The connecting portion 1542 and the platform 1532 are positioned substantially the same height. Openings 1543 and holes 1544 are provided on the element body 1541 and the connecting portion 1542, respectively.

Figure 5A:
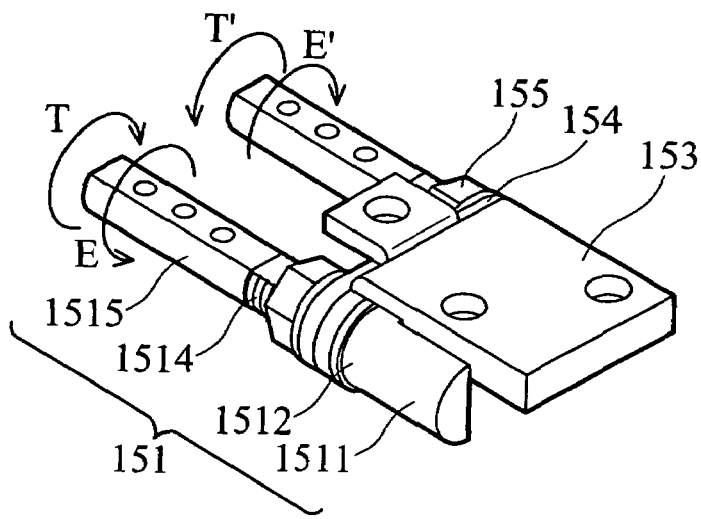
FIG. 5A depicts the shaft structure of FIG. 3 when the handle assembly is spread to a limit position.

To assemble the shaft structure 15, the connecting element 154 and the supporting stand 153 are collected, with the element body 1541 contacting the stand body 1531 and the opening 1543 aligning with the opening 1533. Then, the rotary shaft 151 is led through the washer 157, the openings 1533, 1543, the washer 157' and the nut 155. The result is shown in FIG. 5A, wherein the nut 155 is screwed on the threaded portion 1514, and the washer 157', the element body 1541, the stand body 1531 and the washer 157 are supported by the supporting portion 1513 and held between the nut 155 and the expanding portion 1512.

Figure 5B:
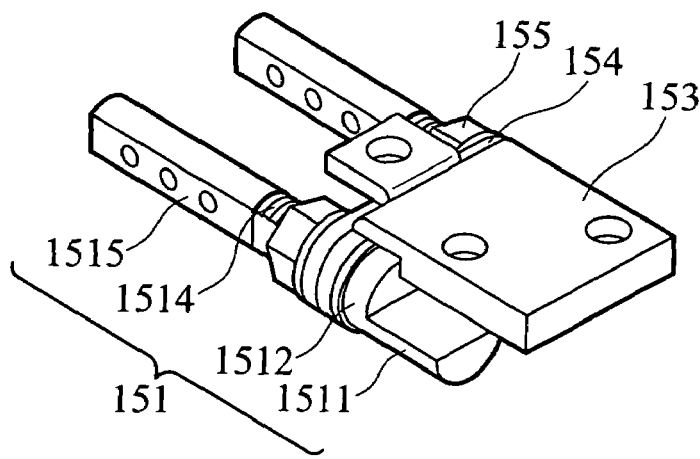
FIG. 5B depicts the shaft structure of FIG. 3 when the handle assembly is collapsed.

If forces are exerted on the shanks 1515 in directions E, E', the rotary shafts 151 will then change their positions as shown in FIG. 5B. It is noted that the supporting stand 153 and the connecting element 154 remain stationary during the rotation of the rotary shafts 151.

The connection of the shaft structure 15 to other elements is now described in detail. The shaft structure 15, as mentioned above, has an end fixed to the support 13 (FIG. 2) and the other end fixed to the extending portions 14 (FIG. 3). Specifically, the shaft structure 15 and the support 13 are fastened together by threading the screws 16 through the holes 133 into the holes 1535, 1544. Furthermore, the shaft structure 15 and the extending portions 14 are fastened together by threading screws 148, through the holes (not shown) on the bottoms of the connecting sleeves 144, into the holes 1516 of the shanks 1515, after the shanks 1515 of the shaft structure 15 are inserted into the connecting sleeves 144 of the extending portions 14.

When the handle assembly 11 is spread to support the main body 12 on a table, the weight of the main body 12 is transmitted through the support 13 and the shaft structures 15 to the extending portions 14. The reaction forces of the extending portions 14 to the weight, indicated by reference symbols T, T' in FIG. 5A, act on the shanks 1515 of the shaft structures 15 and force the rotary shafts 151 to rotate until the positioning portions 1511 abut the supporting stand 153. That is, the supporting stand 153 stops the rotary shafts 151 from further rotating in directions of forces T, T', where the handle assembly 11 is exactly in the limit position as shown in FIG. 1A. Also, the bottom of the support 13 is abutted by the positioning protrusions 146 (shown in FIG. 3). It is noted that the reaction forces T, T' are resisted primarily by the supporting stand 153 and secondarily by the bottom of the support 13.

To collapse the handle assembly 11, the user lifts the device 10 from the table and rotates the extending portions 14 in directions E, E'. The rotary shafts 151 follow the rotation of the extending portions 14 to release the supporting stand 153 from the positioning portions 1511 as shown in FIG. 5B wherein the positioning portions 1511 are turned to the positions below the supporting stand 153.

In the above descriptions the handle assembly 11 has two extending portions 14 for stabilizing the device 10 on a table. It is understood, however, that reduction of the number of the extending portions to one is feasible if the center of gravity of the device 10 is properly designed. Furthermore, the length of the extending portion 14 can be shortened, with one end fixed to the shaft structure 15 and the other end free. Then, the shaft structure 15 of the handle assembly 11 has only one rotary shaft 151.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A portable device comprising:
    a main body; and
    a handle assembly, comprising:
        a support connected to the main body;
        a first extending portion, comprising a connecting sleeve on which a positioning protrusion is fixed; and
        a first shaft structure connecting the support and rotatably connecting the connecting sleeve of the first extending portion,
    wherein when the first extending portion is rotated relative to the support to a limit position, the position protrusion of the first extending portion abuts the support so that the handle assembly supports the main body to stand on a surface.

2. The portable device as claimed in claim 1, wherein the handle assembly further comprises a second extending portion rotatably connected to the first shaft structure.

3. The portable device as claimed in claim 2, wherein the first shaft structure comprises a pair of rotary shafts arranged in parallel and respectively connected to the first and second extending portions.

4. The portable device as claimed in claim 2, wherein the support has two ends, the handle assembly further comprises a second shaft structure, the first shaft structure is disposed at one of the two ends of the support, and the second shaft structure is disposed at the other end of the support and rotatably connects the first and the second extending portions, respectively.

5. The portable device as claimed in claim 1, wherein the first shaft structure comprises a supporting stand fixed to the support, and a rotary shaft supported by the supporting stand and fixed to the connecting sleeve of the first extending portion, whereby the rotary shaft stops the handle assembly in the limit position by abutting the supporting stand.

6. The portable device as claimed in claim 5, wherein the rotary shaft comprises a positioning portion by which the rotary shaft abuts the supporting stand.

\* \* \* \* \*